United States Patent

[11] 3,593,294

[72] Inventors Zwi Kohorn
Cambridge;
Harold H. Seward, Arlington, both of, Mass.

[21] Appl. No. 749,680
[22] Filed Aug. 2, 1968
[45] Patented July 13, 1971
[73] Assignee Compu-Reader, Inc.
Boston, Mass.

[54] ARTICLE IDENTIFICATION SYSTEM
9 Claims, 8 Drawing Figs.

[52] U.S. Cl. .......... 340/152, 178/6.7
[51] Int. Cl. .......... H04g 3/00
[50] Field of Search .......... 340/152; 178/6.7 A; 250/219

[56] References Cited
UNITED STATES PATENTS
2,641,753 6/1953 Oliwa .......... 250/219 (Id)
2,714,843 8/1955 Hooven .......... 250/219 X (Id)

*Primary Examiner*—Ralph D. Blakeslee
*Attorney*—Cushman, Darby and Cushman

ABSTRACT: A system for automatically identifying an article by applying to it a coded record which is accurately sensed by a reader in spite of limited misorientation of the record during sensing. The record includes coded data tracks framed within clock tracks. The data and clock elements of these tracks are in identical space relationship. Each track is provided with a sensing device, the sensing devices associated with the clock tracks being displaced upstream of the data sensing devices by a distance equivalent to one-half the length of a data or clock element. The clock track sensing devices are connected to a detector arrangement which responds to the conditions at the end of a clock element in each clock track to effect reading of data elements then adjacent their associated sensing devices. The data which is read is thereafter distributed to data display and/or data storage devices.

INVENTORS
ZWI KOHORN
HAROLD H. SEWARD

BY Cushman, Darby & Cushman
ATTORNEYS

INVENTORS
ZWI KOHORN
HAROLD H. SEWARD
BY
Cushman, Darby & Cushman
ATTORNEYS

INVENTORS
ZWI KOHORN
HAROLD H. SEWARD
BY
Cushman, Darby & Cushman
ATTORNEYS

INVENTORS
ZWI KOHORN
HAROLD H. SEWARD

BY Cushman, Darby & Cushman
ATTORNEYS

INVENTORS

ZWI KOHORN
HAROLD H. SEWARD

BY Cushman, Darby & Cushman
ATTORNEYS

INVENTORS
ZWI KOHORN
HAROLD H. SEWARD

BY Cushman, Darby & Cushman
ATTORNEYS

ARTICLE IDENTIFICATION SYSTEM

The present invention is directed to the solution of problems encountered in monitoring the whereabouts and/or availability of one or more items among many. A typical example is a large file storage system wherein it is extremely important to be able to quickly locate a given file folder. Another example is an inventory control system in which a running account is maintained of items in stock.

The advent of sophisticated data processing machines offered the prospect of much tedious human work being eliminated in the area of record control, and thus, considerable effort has been expended in "automation" in this field. However, a data processing device is only as good as the accuracy of information provided it. Heretofore, considerable difficulties have arisen in attempts to correctly read information characteristic of an item and to supply such information to the data processor. For example, in conventional automated systems, considerable care must be exercised in proper preparation of an article identification record and correct orientation thereof with respect to a sensing arrangement when the record information is being read. Any carelessness on the part of the operator in preparing or reading the record results in the disruption of accurate operation of the data processing device, which inaccuracy may go undetected.

It is therefore a principal object of the invention to provide an article identification system which considerably reduces the amount of care which must be exercised by the system operator; or stated otherwise, increases the tolerances for accurate automatic operation without requiring highly skilled personnel to run the system.

Briefly, this is accomplished by forming a coded record which is applied to each item to be controlled. The record comprises data tracks positioned between clock tracks. The data and clock tracks contain a like number of track elements, and these elements occupy identical space relationship on the record. During the reading operation, the record is roughly aligned on a conveyor which carries the record past a sensing station. This station includes sensing devices associated with each of the record tracks. The devices associated with the clock tracks are displaced upstream of the data track sensing devices by a distance which is one half the length of a data or clock element. The sensing devices are connected to detectors such that operation of the clock track detector actuates suitable logic circuitry to effect the reading of the data tracks. The sensed data is then distributed to a data display and a data processing device. An alarm system is associated with the system to be actuated on completion of the record reading cycle if the record has been severely misoriented with respect to the sensing station and, thus, misread.

The invention will be described in further detail by reference to the accompanying drawings, wherein.

Figure 1:
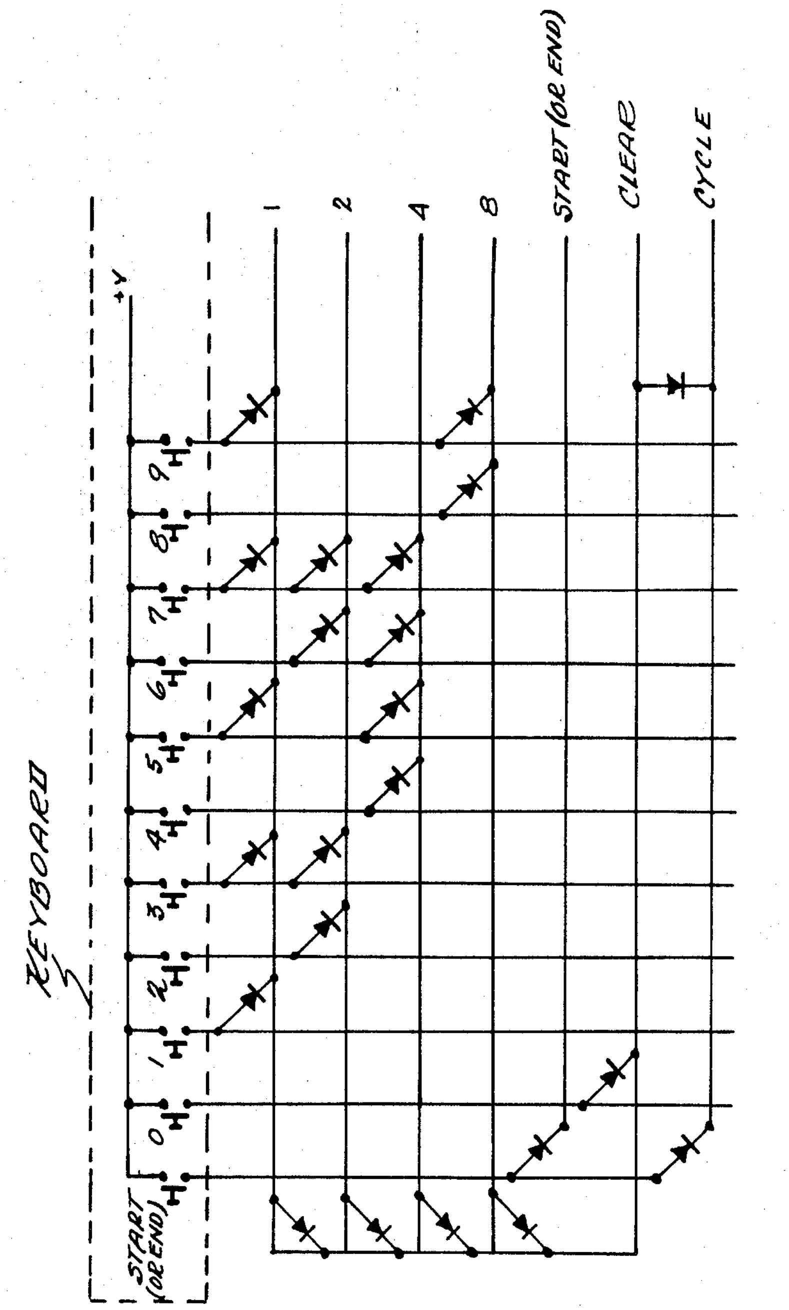
FIG. 1 is a schematic diagram of a diode matrix employed in developing control signals for making a record.

Referring now to the drawings, the invention will be described in detail. FIG. 1 represents a conventional diode matrix for developing the control signals for the record-making portion of the system. The matrix is energized by depression of the keys of a keyboard. Individual keys for each of the decimal digits 0—9, as well as a start (or end) record key for developing a code representing the start or end of the record, are provided at the keyboard.

The matrix includes output lines upon which start (or end), clear and cycle pulses are generated. Actuation of the start (or end) record key produces outputs on the start (or end) and cycle output lines, whereas depression of any other key on the keyboard develops one or more data pulses, as well as clear and cycle output pulses from the matrix.

Figure 2:
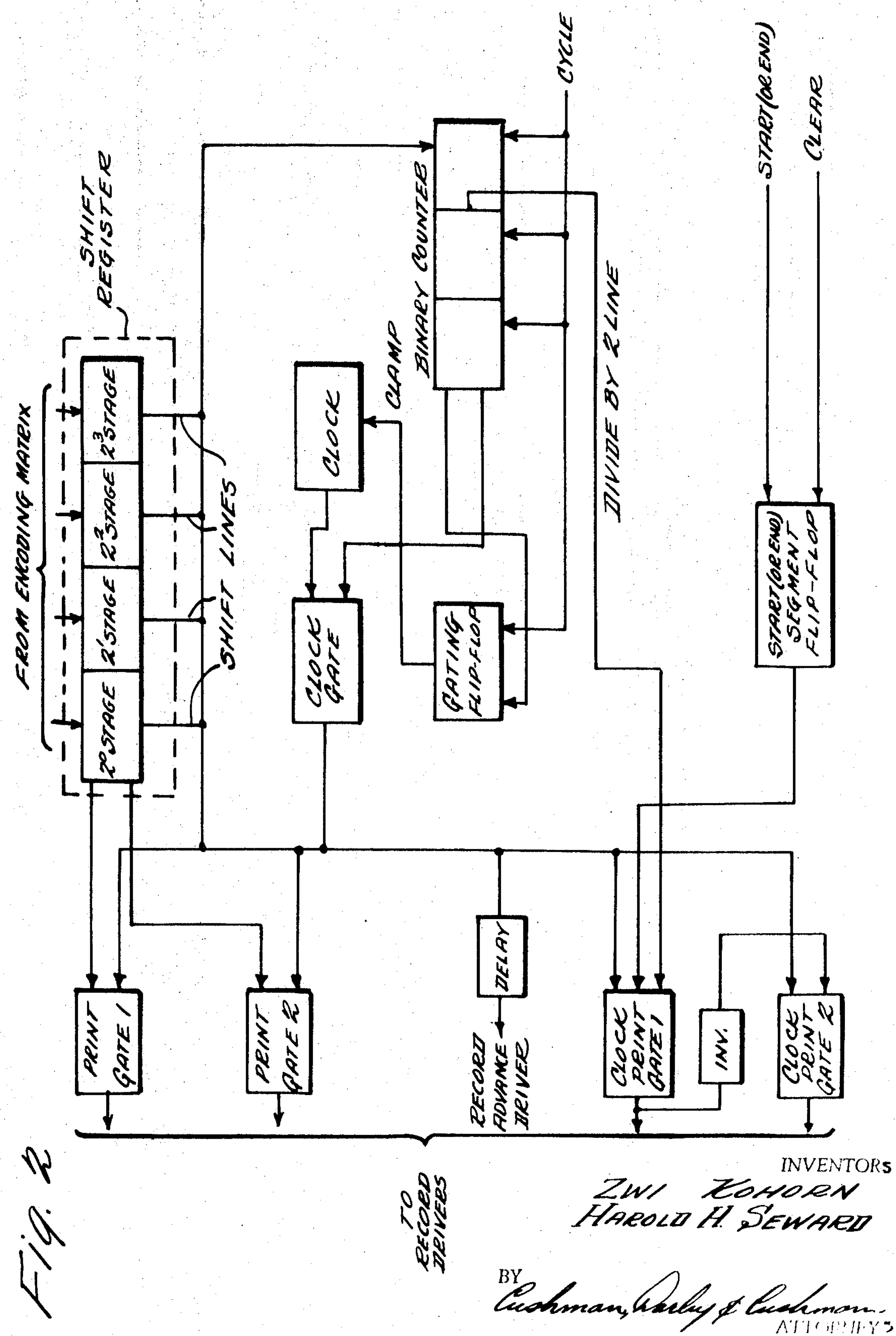
FIG. 2 is block diagram of a logic network utilizing control signals from the diode matrix of FIG. 1 to form the record.

The data pulses appearing on the one, two, four, and eight output lines of the diode matrix are connected respectively to the $2^0$, $2^1$, $2^2$ and $2^3$ stages of a shift register forming a portion of the logic network shown in FIG. 2. This network also includes a binary counter and a gating flip-flop. The counter is a conventional one comprising three stages of a flip-flops. The clear input lines of each of the counter flip-flops and the gating flip-flop are joined to the cycle output line of the diode matrix of FIG. 1. The set output line of the third stage of the counter is joined to the set input line of the gating flip-flop. The set output line of the gating flip-flop is connected to a conventional clock such that when the gating flip-flop is set, the clock is clamped. The clock output is connected to one input of an AND gate designated as the clock gate, the other input being the signal on the clear output line of the counter's third stage. The clock gate output is joined as one input to several AND gates identified as print gates 1 and 2 and clock print gates 1 and 2. The output of the clock gate is also supplied as an input to the first stage of the binary counter as well as being utilized in shifting information within the shift register. The set output line of the $2^0$ stage of this register is connected to the second input of print gate 1, while the clear output line of this stage is joined to the second input of print gate 2. A second input to clock print gate 1 is a line extending from a point of the binary counter at which the counter has performed a divide by two function. The third input to clock print gate 1 is the clear output of a start (or end) segment flip-flop to which the start (or end) and clear signals from the diode matrix are applied respectively to the set and clear input lines. The input to clock print gate 2 is the inverted output of clock print gate 1. The outputs of the print gates are connected to separate drivers of the record forming device. For example, in the case where the record is to be made by conventional printing, the gates are joined to hammer actuating mechanisms for suitably impacting the record medium. The delayed output of the clock gate serves to energize a record advance driver to move this medium following each recording step.

Now that the structure of the logic network of FIG. 2 has been outlined, the printing operation will be described. To prepare the system for operation, the record drivers and record advance driver are first disconnected and any of the 0—9 keys associated with the diode matrix is actuated. This causes the corresponding number to be encoded by the matrix and entered into the shift register in the binary notation. Simultaneously, clear and cycle pulses are generated by the matrix. These clear the start (or end) segment flip-flop, the binary counter and the gating flip-flop. The clock is thereby unclamped, and the clock gate conditioned, to pass clock pulses to the binary counter and to the shift register. On the fourth clock pulse, the third stage flip-flop of the counter is set to in turn set the gating flip-flop thereby clamping the clock to preclude further clock pulses from passing to the clock gate. To additionally insure against pulses passing to the print gates and the record advance driver, the clock gate is disabled when the third stage of the counter is set. As a result of four pulses having been generated, the original entry into the shift register is cleared therefrom. The system is thereby readied for the recording operation which will now be described.

Figure 3:
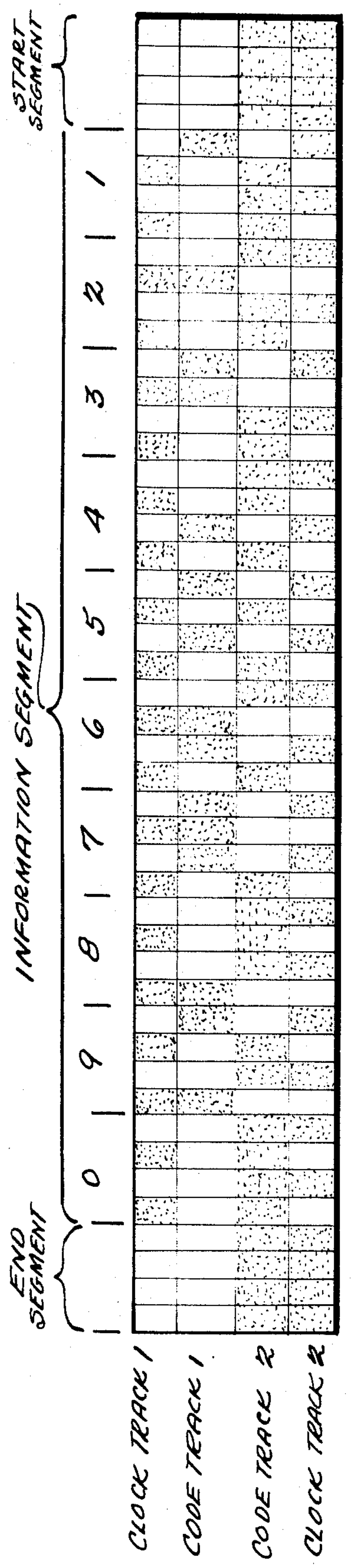
FIG. 3 is a representation of a typical record format.

To form a record, the start (or end) switch of the keyboard is depressed with the record and record advance drivers connected to the system. The resultant signal on the start (or end) output line of the diode matrix sets the start (or end) segment flip-flop. The condition on the clear output line of this flip-flop prevents the clock print gate 1 from being enabled. Therefore, the clock print gate 2 is partially enabled by the inverted output of print gate 1. Simultaneously, the cycle signal generated by the matrix causes four clock pulses to be passed to the print gates and the record advance driver. Since no data has been inserted into the shift register, the $2^0$ stage flip-flop remains cleared to partially condition print gate 2. As a result, the four clock pulses are passed by print gate 2 and clock print gate 2 to their respective record drivers. Since the clock pulses also step the record medium through four advances by means of the record advance driver, a start code is impressed on the medium as illustrated in FIG. 3. On completion of the start code, the clock is clamped as hereinbefore described.

The start code having been recorded, the system is now prepared to receive data. For purposes of illustration, the insertion of decimal 5 will be outlined. On depression of key 5, outputs from the diode matrix appear on the one, four, clear and cycle output lines of the matrix. Thus, the binary "1" is inserted into stages $2^0$ and $2^2$ of the shift register. This results in the $2^0$ stage flip-flop being set to partially enable print gate 1. Simultaneously, the binary counter, the gating flip-flop and the start (or end) segment flip-flop are cleared. Thus, clock print gate 1 is partially conditioned and the clock is unclamped.

The first clock pulse completes the conditioning of print gate 1 and clock print gate 2 to permit actuation of their associated record drivers. At the same time the binary counter registers the first count. The delayed clock pulse then advances the record medium one step and the contents of the shift register are moved to the next lowest stage, the original $2^0$ stage content being discarded. This shifting causes reversal of the condition of the $2^0$ stage so that the flip-flop is cleared. Thus, print gate 2 becomes partially conditioned and print gate 1 is disabled.

The occurrence of the second clock pulse produces an output on the divide by two line from the counter to complete the conditioning of the clock print gate 1, the inverted output of which disables clock print gate 2. It is apparent that while this is happening, print gate 2 is enabled. The outputs of the enabled gates energize their respective record drivers to further develop the record. Following the printing, the record is again advanced.

For the third and fourth pulses of this cycle, the operation described with respect to the first and second pulses is respectively repeated. Subsequent to the fourth pulse, the clock is clamped as heretofore described.

The appearance of the data, such as decimal 5, can be seen in FIG. 3. This diagram illustrates that the record formed by the printing operation comprises two clock tracks and two code tracks, the latter containing the recorded information. During the information segment of the record each clock track is alternately printed and unprinted as the record is stepped. For a given position, or step, one of the clock tracks is printed while the other is not. Similarly, for the code tracks, at each space one track is printed and the other is not. The data otherwise may be arranged within the code tracks in any convenient pattern, or code. A typical arrangement for the decimal numbers one, two,...zero is shown in FIG. 3. Another characteristic of the physical form of the record is that the code tracks are located between the clock tracks. The reason for this will be explained hereinafter.

Figure 4:
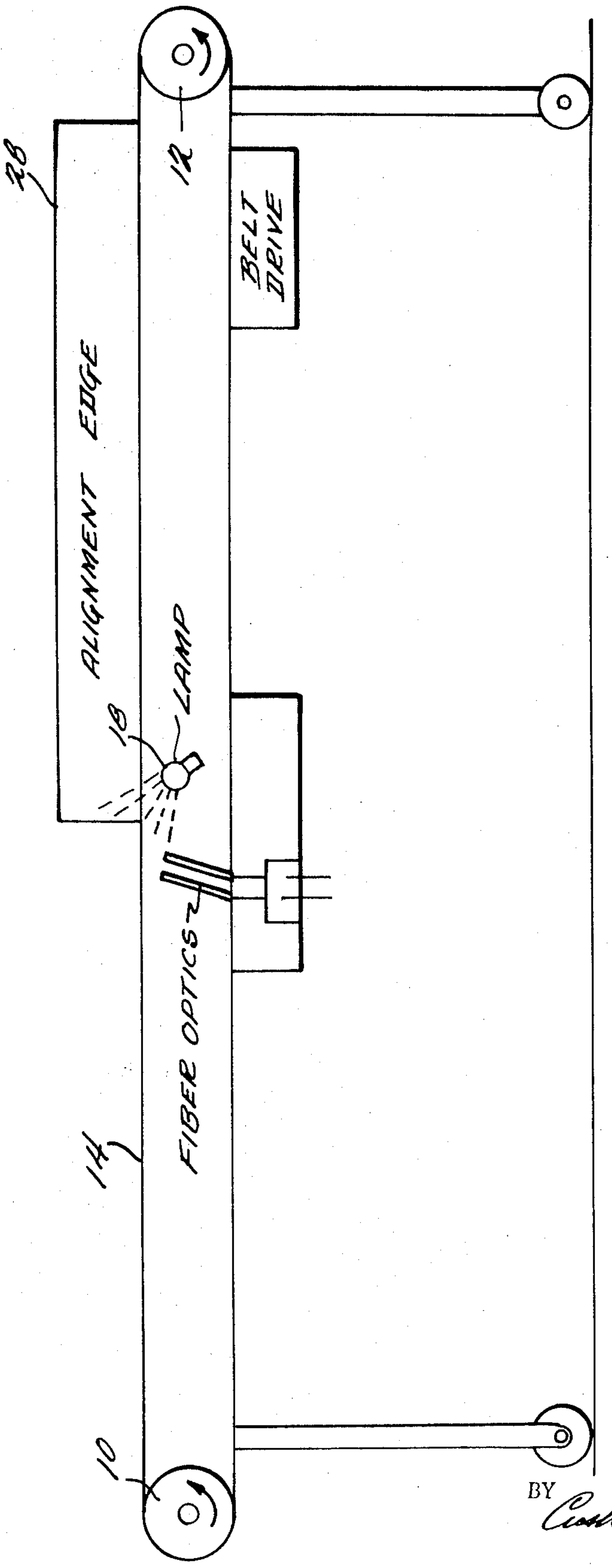
FIG. 4 is a side elevational view of a conveyor and associated sensing station for reading a record.
Figure 5:
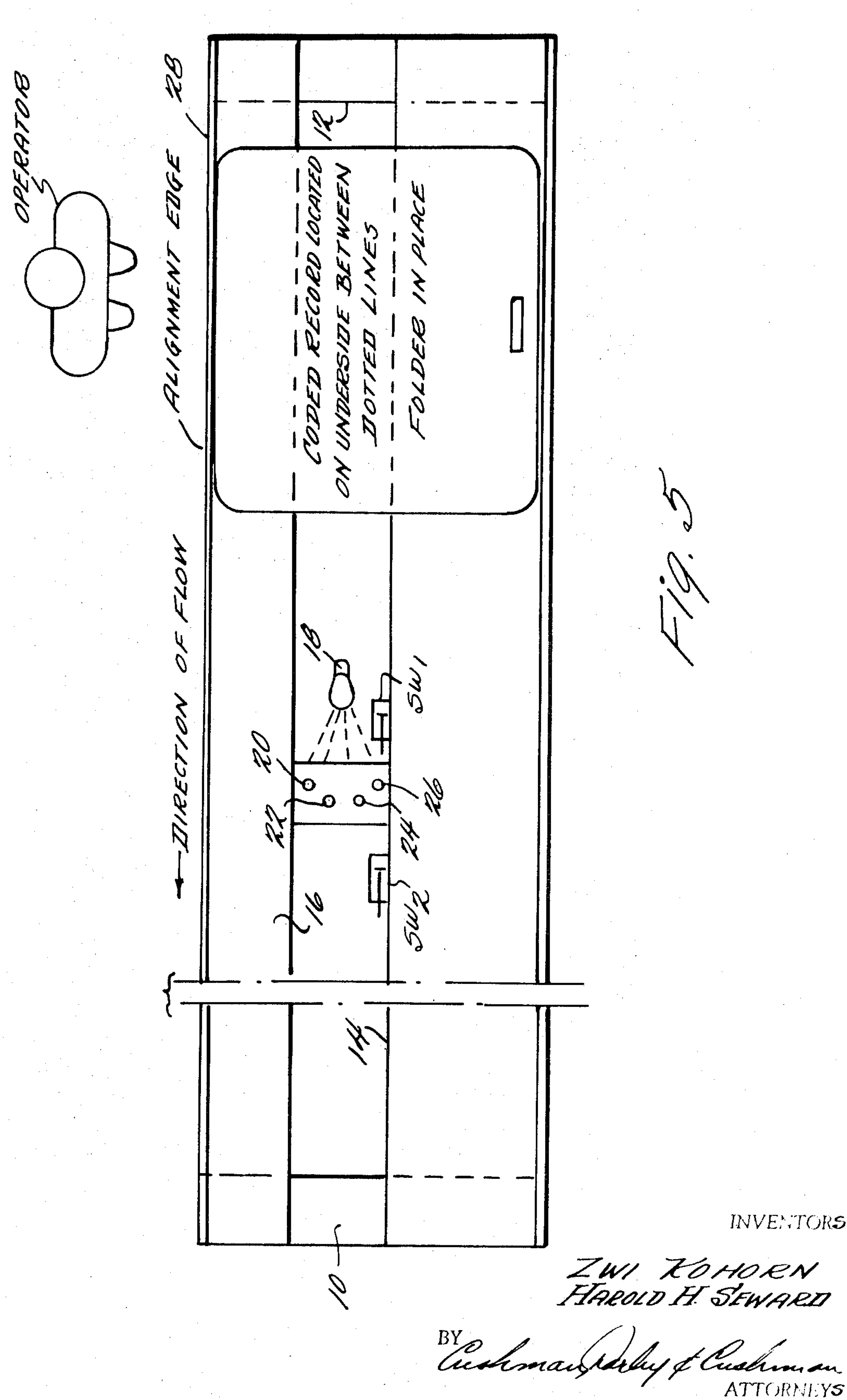
FIG. 5 is a top elevational view of the apparatus shown in FIG. 4.

FIGS. 4 and 5 illustrate an arrangement for sensing the recorded information. More particularly, these figures show a conveyor system comprising a pair of capstans 10 and 12 about which a pair of spaced belts 14 and 16 are positioned. One of the belts is driven, as diagrammatically illustrated in FIG. 4, so as to cause movement of the capstans in a counterclockwise direction as shown. A reading station is positioned between capstans 10 and 12 in the space between belts 14 and 16. The sensing mechanism includes a light source 18 and four fiber optic elements 20, 22, 24 and 26 located below the upper level of the conveyor belts. These elements are spaced from one another, in a direction transversely of the belt movement, by distances corresponding to those between the clock and code tracks of the record, as shown in FIG. 3. Thus, with the record positioned above the fiber optics, facing downwardly, element 20 is adjacent clock track 1; element 22 is adjacent code track 1; element 24 is adjacent code track 2; and element 26 is adjacent clock track 2. It can be seen in FIG. 5 that fiber optic elements 22 and 24 are equally offset with respect to a line between elements 20 and 26 in a direction upstream of the belt movement. The amount of this offset corresponds to half the length of a printed space of the record. Consequently, for a given space of a record segment perfectly oriented transversely to the direction of movement of the conveyor belts, the centers of the spaces of the code tracks are located immediately adjacent fiber optic elements 22 and 24 when the leading edges of the clock track elements controlling the readout of the data in the given space are immediately adjacent elements 20 and 26. The advantages of this arrangement will be pointed out hereinafter.

The sensing mechanism also comprises a pair of microswitches S*w*1 and S*w*2 which are respectively located upstream and downstream of the fiber optic arrangement. These switches include actuating arms which project above the level of the upper surfaces of belts 14 and 16. In the illustrative embodiment, these arms are spaced, in the direction of belt movement, by a distance somewhat less than the length of the start segment of the record.

In operation, an article to be identified, as for example a file folder, is supplied with a coded record of the type described with reference to FIG. 3. The beginning of the start segment of the record is preferably located at the leading edge of the folder. When the folder is placed on the moving conveyor as shown, it is roughly oriented on the belts by means of an alignment element 28. With this folder orientation, the record faces downwardly and is positioned between belts 14 and 16. Of course, the record is arranged on the article, from start segment to end segment, in the direction of belt movement. As the folder proceeds towards the sensing unit, its leading edge contacts the projecting arm of switch S*w*1. This switch, as well as switch S*w*2, is operatively connected to lamp 18 to thereby illuminate same. As the record proceeds over the fiber optic elements, the unprinted or light areas of the record reflect light along the elements and the printed or dark areas absorb light such that very little is reflected along the associated fiber optic element. Continued movement of the folder results in the leading edge thereof actuating switch S*w*2. The two microswitches are thereby closed until the trailing edge of the folder passes S*w*1 and S*w*2 to permit these switches to successively open. Lamp 18 remains lit until after the trailing edge of the folder has passed switch S*w*2.

Figure 7:
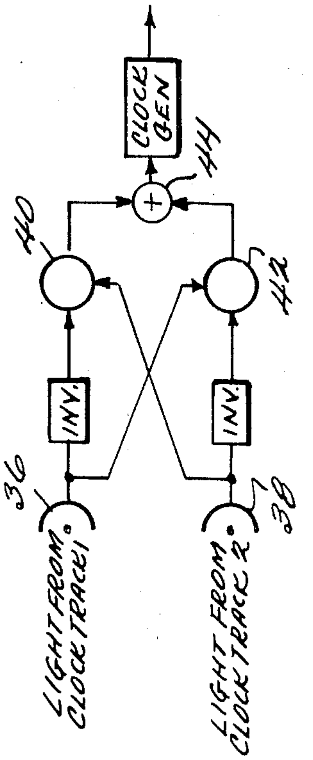
FIG. 7 is a block diagram of a clock track detector.
Figure 6:
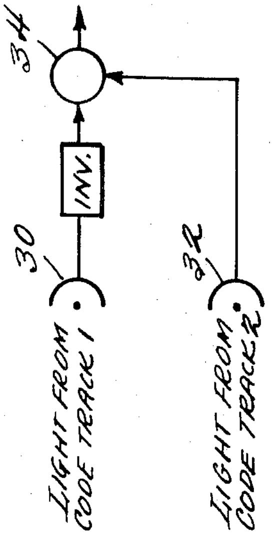
FIG. 6 is a block diagram of a code track detector.
Figure 8:
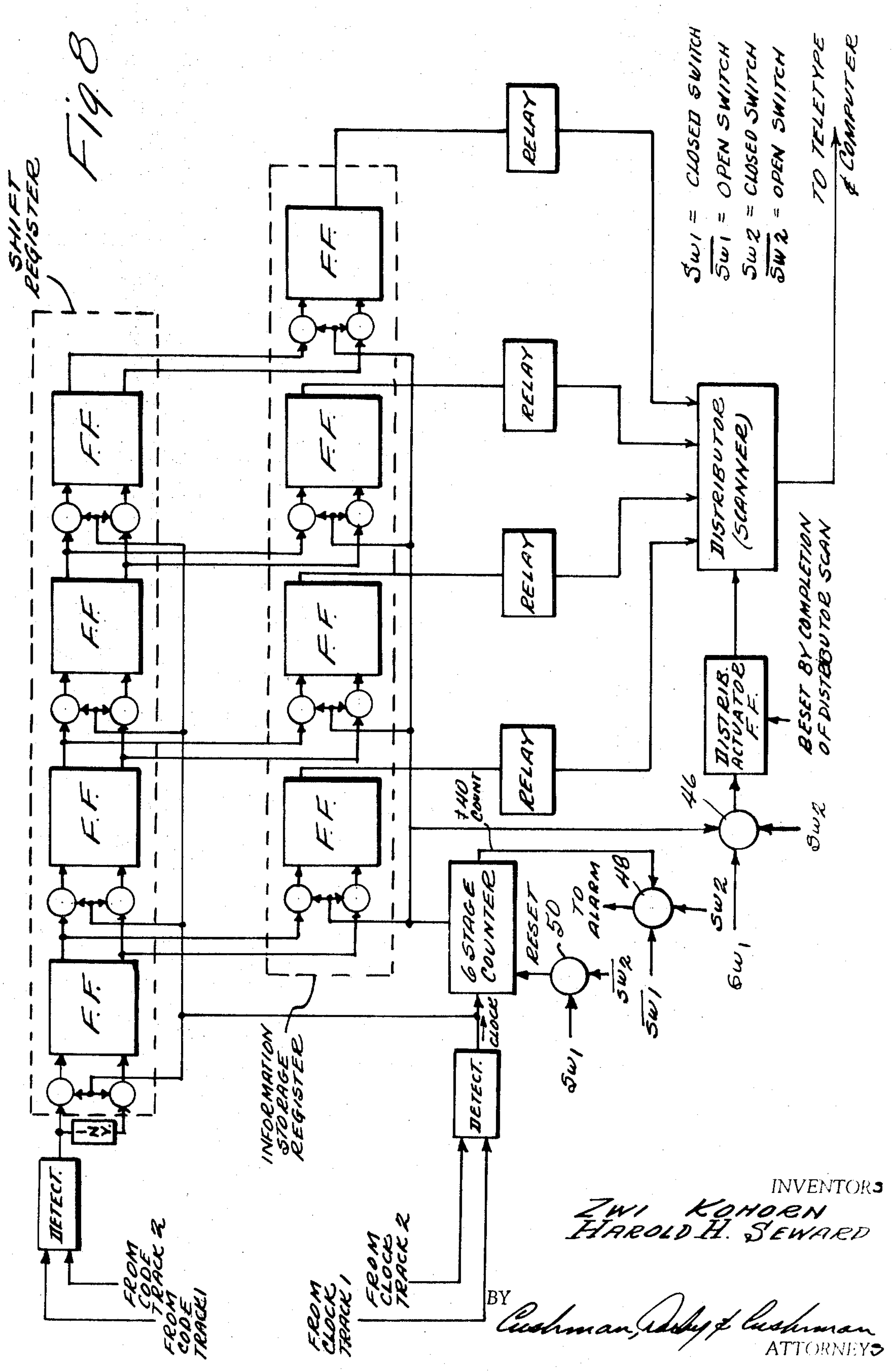
FIG. 8 is a block diagram of a logic network operating on a sensed information from the record and distributing data to a display and to a data processing device.

The logic arrangement by which the information sensed is utilized is shown in FIGS. 6—8. Light transmitted by the fiber optic elements is directed to detectors which convert light energy into electrical signals. More particularly, the light reflected from the code tracks is applied to a first detector arranged to respond to transitions from a light to a dark area in code track 1 and from a dark to a light area in code track 2 to produce a pulse output which terminates when these conditions are not fulfilled.

The detector with which the clock track fiber optic elements are associated is arranged to produce a clock pulse output each time transitions occur from a light to a dark area in clock track 1 and from a dark to a light area in clock track 2, or vice versa.

Representative circuitry for performing the detection functions is illustrated in FIGS. 6 and 7. FIG. 6 discloses a circuit capable of detecting information from the code tracks in the manner just outlined. More particularly, reflected light from the code track 1 is transmitted by fiber optic element 22 to a photocell 30. Similarly, light from code track 2 is carried by element 24 to photocell 32. Absence of light at photocell 30 produces a voltage level different from that of photocell 32 when the latter is illuminated. By connecting photocell 30 through an inverter to AND gate 34, to which cell 32 is also joined, the gate is enabled to produce an output only when a dark area in code track 1 and a light area in code track 2 are being sensed.

FIG. 7 illustrates a detector circuitry for the clock tracks. Reflected light from clock tracks 1 and 2 are directed by fiber optic elements 20 and 26 to photocells 36 and 38, respectively. The output of cell is connected through an inverter to AND gate 40 and directly to AND gate 42. The output in photocell 38 is joined directly to gate 40 and through an inverter to gate 42. The outputs of gates 40 and 42 are connected through an OR gate 44 to a clock generator which produces a clock pulse for each input thereto. With the foregoing circuitry, only the presence of a dark area in clock track 1 and a light area in clock track 2, or vice verse, results in the conditioning of gate 40 or 42 and the subsequent generation of a clock pulse from the generator.

Referring now to FIG. 8, the output of the detector associated with the code tracks is connected via an AND gate to the set input line of the first flip-flop stage of a four stage shift register. This detector input is also inverted and applied through another AND gate to the clear input line of the first stage flip-flop of the shift register. The clock pulse output from the second detector partially enables and the AND gates ahead of the first stage as well as AND gates between the remaining shift register stages. The clock pulses are also applied to a 6 stage counter. The set and clear output lines of each shift register stage are connected through additional AND gates to respective set and clear input lines of a four stage information storage register. The output of the second stage of the counter is applied to each of the AND gates between the shift register and the information storage register so that on each fourth pulse applied to the counter, the gates to the information storage register are partially enabled to permit the shift register contents to be dumped into the information storage register.

The set output line of each flip-flop of the information storage register is connected to a separate relay. Each relay is associated with a different position of a conventional distributor, or scanner. The scanning operation is controlled by a distributor actuator flip-flop which is set when switches S*w*1 and S*w*2 are closed and when an output pulse is obtained from the second stage of the six stage counter. Such setting of the distributor actuator flip-flop is accomplished through an AND gate 46. On completion of the scan by the distributor, a pulse is generated (by means not shown) to reset the distributor actuator flip-flop. During the scanning operation, each of the distributor terminals is sequentially examined to determine the state of its associated relay. The sequential pulse pattern thus developed is interfaced by conventional means to teletype and computer mechanisms which respectively print out and store the sensed information from the record.

By the time the entire record has been sensed, a total of 40 clock pulses will have been generated so long as the record is not skewed to an extent that the fiber optic elements 20 and 26 are responding to areas of the clock tracks which are displaced by two or more spaces from one another. To confirm that correct operation has occurred, an alarm arrangement is incorporated into the system. More particularly, an AND gate 48 is provided with three inputs representative of the open condition of switch S*w*1, the closed condition of switch S*w*2 and a count not equal to 40 from the counter (e.g., an inversion of the output of an AND gate having inputs from the fourth and sixth stages of the counter). As prescribed by the physical arrangement of switches S*w*1 and S*w*2 as hereinbefore stated, when switch S*w*1 opens, the entire data portion of the record will have been read if the record is not too severely skewed. Thus, a count of 40 should have been reached by the counter. If not, gate 32 is conditioned to sound an alarm indicating an incorrect reading operation. The operator of the system can then take steps to delete the information distributed to the computer, disregard the teletype printout and repeat the reading operation. On commencing a subsequent reading operation, the closure of switch S*w*1 before switch S*w*2 is used to enable an AND gate 50 to produce a reset pulse for the counter.

To illustrate the operation of the circuit of FIG. 6, is will be assumed that the decimal 6, as represented in FIG. 3, is to be sensed as the first element of the record's information segment. The condition of the shift register and the information storage register at the beginning of the reading cycle is that retained from the last information element of the previous reading cycle. The 6 stage counter is first cleared by the closure of switch S*w*1 due to contact with the leading edge of the folder bearing the record. Since during the start segment there are no dark areas in code track 1 and no transitions from a dark area to a light area, and vice verse, in the clock tracks, there are no pulse outputs from the detectors. As a result the shift register remains static.

At the beginning of the first space of the information segment of the record, there are no transitions in the code tracks. Thus, the first stage flip-flop of the shift register remains in its original condition. At the end of the first space, there is a transition from a light to a dark area in one clock track and from dark to light in another. Thus, a count is entered in the counter, the shift register contents are displaced to the right one stage, and the second stage flip-flop assumes the original state of the first stage flip-flop. The original content of the fourth stage flip-flop is shifted out of the register.

The beginning of the second space of the information segment of the record presents a dark area in code track 1 and a light area in code track 2 thereby producing an output from the detector. At the end of the second space, another clock pulse is generated to again actuate the counter and shift the register contents. The first stage flip-flop is set and the fourth stage information is discarded.

Since the beginning of the third space of the information segment of the record does not have transitions in the code tracks, the detector output remains at the level developed by the second space. The clock pulse at the end of the third space again actuates the counter, shifts the register contents to the right, and sets the first stage flip-flop.

At the beginning of the fourth space of the information segment of the record, there is a transition from a dark to a light area in code track 1 and from light to dark in code track 2. The output level of the code track detector thereby changes so that at the time of the fourth clock pulse the resultant inverter output clears the first stage flip-flop of the shift register while the previously entered information is shifted. The shift register thereby assumes the binary condition, from left to right, of 0110. The occurrence of the fourth clock pulse also results in certain AND gates between the shift register and the information storage register being enabled to thereby dump the contents of the shift register into the information storage register to set the second and third flip-flops thereof. Switch S*w*2 having been closed prior to the beginning of information sensing, the fourth clock pulse results in the enabling of AND gate 46 to start the scanning cycle. Since, as stated previously, the information storage register flip-flops are set in the second and third stages, the relays associated therewith are energized. Thereafter, distributed of this information to the teletype and computer and resetting of the distributor actuator flip-flop occur as outlined above.

The reading cycle continues for each of the remaining 10 portions of the information segment in the manner just-described. On completion of this cycle, the alarm logic checks to determine that 40 clock pulses have been generated. If not, the alarm sounds and the operator attends to corrective action.

An important feature of the invention which has not been sufficiently emphasized as yet is the staggered arrangement of the fiber optic elements 20 and 26 with respect to elements 22 and 24. With an arrangement wherein the code track elements 22 and 24 are located at the centers of the code spaces when the clock track elements are at the edges of the corresponding clock spaces in a nonskew condition, it is apparent that such an arrangement also permits reliable reading when substantial record skew is present. More particularly, if because of skew one of the clock track sensing devices arrives at a transition in its track before its companion does, the generation of the clock pulse is delayed. However, with the code track sensing elements staggered, such delay does not affect the reading, for the code track sensing elements are still in operative relationship with the correct spaces of the code tracks. This is particularly true when the widths of the clock track spaces, as measured transversely of the length of the record, are less than those of the code tracks, as shown in FIG. 3. With the system disclosed herein, accurate reading can be achieved even with a considerable amount of record skew. If the skew becomes abnormal, the number of clock pulses generated will not reach 40, and the alarm system will detect such a condition.

The foregoing description is of a preferred embodiment of the invention. However, it is apparent that a number of alternatives are possible without departing from the scope of the invention. For example, instead of employing a printed record, other forms of records such as magnetic, punched, phosphorescent, etc. could be employed. Also variations in codes, logic arrangements, physical positioning of switches and sensing devices, location of the records on the articles, and the like could be utilized.

The structure disclosed herein is an example of an arrangement in which the inventive features of this invention may be utilized, and it will be apparent to one skilled in the art that certain modifications may be made within the spirit of the invention as defined by the appended claims.

What we claim is:

1. A system for identifying an article comprising:
a. a coded record which is applied to said article, said record being formed with at least two separated clock tracks between which are located at least two code tracks;
b. means for simultaneously sensing each of said code tracks to obtain article identifying data therefrom;
c. means for simultaneously sensing each of said clock tracks to obtain a train of clock pulses;
d. means under the control of said clock pulses for distributing said data to display and/or processing devices; and
e. means responsive to the number of clock pulses obtained by the clock pulse sensing means during a reading operation to indicate the accuracy of the record sensing.

2. A system as set forth in claim 1, wherein said tracks occupy a plurality of substantially identical time spaces on said record and wherein said track sensing means include:
a. a conveyor for carrying said record past a reading station;
b. individual sensing devices positioned immediately adjacent each of said tracks; and
c. logic circuitry interconnected between the sensing devices and the distributing means.

3. A system for identifying an article comprising:
a. a coded record which is applied to the article, said record being formed with at least two separated clock tracks between which are located at least two code tracks, said tracks occupying a plurality of substantially identical time spaces on said record and each of said tracks containing information in either one of two states, code information in one code track space being the opposite state of code information than in the corresponding space of another code track and clock information in one clock track space being the opposite state of clock information than in the corresponding space of another clock track;
b. means for simultaneously sensing each of said code tracks to obtain article identifying data therefrom;
c. means for simultaneously sensing each of said clock tracks to obtain a train of clock pulses; and
d. means under the control of said clock pulses for distributing said data to display and/or processing devices.

4. A system as set forth in claim 3, wherein clock track information alternates in state at each successive track space.

5. A system for identifying an article comprising:
a. a coded record which is applied to the article, said record being formed with at least two separated clock tracks between which are located at least two code tracks, said tracks occupying a plurality of substantially identical time spaces on said record;
b. means for simultaneously sensing each of said code tracks to obtain article identifying data therefrom;
c. means for simultaneously sensing each of said clock tracks to obtain a train of clock pulses; and
d. means under the control of said clock pulses for distributing said data to display and/or processing devices;
e. said track sensing means of said system including:
1. a conveyor for carrying said record past a reading station and having means for aligning the article on the conveyor;
2. individual sensing devices positioned immediately adjacent each of said tracks; and
3. logic circuitry interconnected between the sensing devices and the distributing means.

6. A system for identifying an article comprising:
a. a coded record which is applied to the article, said record being formed with at least two separated clock tracks between which are located at least two code tracks, said tracks occupying a plurality of substantially identical time spaces on said record;
b. means for simultaneously sensing each of said code tracks to obtain article identifying data therefrom;
c. means for simultaneously sensing each of said clock tracks to obtain a train of clock pulses; and
d. means under the control of said clock pulses for distributing said data to display and/or processing devices;
e. said track sensing means of said system including:
1. a conveyor for carrying said record past a reading station;
2. individual sensing devices positioned immediately adjacent each of said tracks, the sensing devices associated with the code tracks being displaced with respect to the sensing devices associated with the clock tracks, along the direction of conveyor movement by a distance which is substantially half of a time space; and
3. logic circuitry interconnected between the sensing devices and the distributing means.

7. A system for identifying an article comprising:
a. a coded record which is applied to the article, said record being formed with at least two separated clock tracks between which are located at least two code tracks, said tracks occupying a plurality of substantially identical time spaces on said record;
b. means for simultaneously sensing each of said code tracks to obtain article identifying data therefrom;
c. means for simultaneously sensing each of said clock tracks to obtain a train of clock pulses; and
d. means under the control of said clock pulses for distributing said data to display and/or processing devices;
e. said track sensing means of said system including:
1. a conveyor for carrying said record past a reading station;
2. individual sensing devices positioned immediately adjacent each of said tracks, the sensing devices comprising fiber optic elements operatively associated with a lamp which illuminates said record; and
3. logic circuitry interconnected between the sensing devices and the distributing means.

8. A system as set forth in claim 7, further comprising at least one switch in the path of movement of the article on the conveyor, and actuated by said article, to control the illumination of the lamp.

9. A system as set forth in claim 8, wherein said logic circuitry includes an alarm responsive to the condition of said switch and the number of clock pulses obtained by the clock pulse sensing means during a reading operation to indicate the accuracy of the record sensing.